Oct. 25, 1932.　　P. L. TENNEY ET AL　　1,884,380

FOUR-SPEED STEP-DOWN TRANSMISSION

Filed Nov. 20, 1926

Inventor
Percy L. Tenney
& Harry E. Fidler
By Blackmore, Spencer, & Hiel
Attorneys Patented Oct. 25, 1932

1,884,380

UNITED STATES PATENT OFFICE

PERRY L. TENNEY AND HARRY E. FIDLER, OF MUNCIE, INDIANA, ASSIGNORS TO GENERAL MOTORS CORPORATION, OF DETROIT, MICHIGAN, A CORPORATION OF DELAWARE

FOUR SPEED STEP-DOWN TRANSMISSION

Application filed November 20, 1926. Serial No. 149,634.

This is an invention in gearing. The invention is intended for use on motor vehicles, although its usefulness elsewhere is to be recognized.

It is generally admitted that in the case of many cars the engine may operate to better advantage if its revolutions be reduced for a given rate of travel of the vehicle when driving on substantially level roads. Efforts have been made to get this relation by adding to the conventional transmission a supplementary gear unit by which a driven shaft is speeded above the clutch shaft. Constructions of this kind have certain disadvantages. The separate unit requires an unnecessary duplication of gearing members and operating parts. It also means that the drive at the fourth and highest speed takes place through gearing instead of through a direct clutch. In as much as the fourth and highest speed will be the drive mostly used it is believed that it should be the direct drive.

The object of this invention, is to provide, in a single transmission unit employing the usual clutch shaft, a transmission shaft, countershaft and reverse idler shaft, a system of gearing by which the fourth and highest speed is a direct drive, and the first step-down drive is obtained through a comparatively noiseless internal gear train including an eccentrically located gear.

Another object is to so arrange such a system of gearing that it shall be simple, comparatively easy of manufacture, and easy to assemble and dis-assemble.

These and other objects of the invention will be understood to have been accomplished after a reading of the accompanying description, in which reference is made to the drawing fully illustrating the invention.

Figure 1:
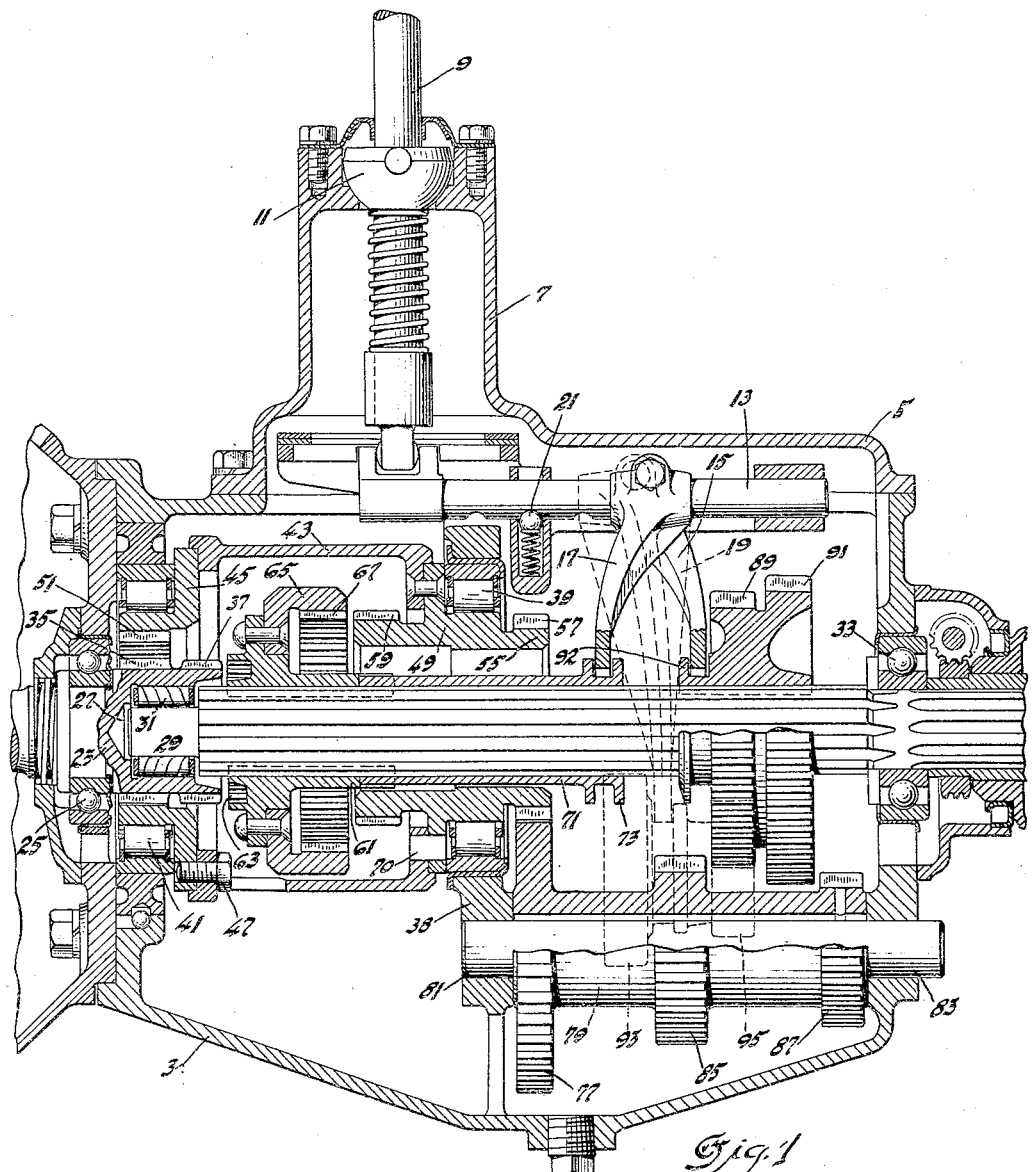
Figure 1 is a longitudinal section through the improved transmission unit.

Referring by reference characters to the drawing 3 is a housing having a cover 5. Through an upwardly directed tubular boss 7 of the cover passes the shift lever 9, a rocking bearing being shown at 11. The lower end of lever 9 is arranged to engage and reciprocate any one of three rods, one of which is represented by 13. Each rod is provided with a fork, the forks being represented by numbers 15, 17 and 19. Suitable spring controlled detents as at 21 indicate to the driver the position of the rods, and consequently of the movable gears.

Inwardly extending from the clutch is a shaft 23, suitable bearings for the shaft being shown at 25. The inner end of this clutch shaft is enlarged and is bored out as at 27 to receive telescopically the extreme forward end of the aligned splined or transmission shaft 29. Roller bearings 31 afford an antifriction means between the adjacent ends of the shafts. The transmission shaft 29 extends out from the rear end of the housing 3 through bearings 33. The supplemental cover and gearing for the speedometer are shown in the drawing, but as they form no part of the invention are not being given specific description.

Just within bearing 25 shaft 23 is provided with external teeth 35, other clutch teeth 37 being formed at the extreme inner end of the shaft 23.

Midway of its length the housing 3 is formed with a partition 38. This partition has an opening through which passes the transmission shaft, the opening being eccentric with reference to said shaft. Within the eccentric opening are bearings 39. A similar eccentrically located bearing 41 is provided at the front end of the housing 3. A ring gear or cage is journalled in the bearings 39 and 41. The ring gear is formed of three parts, the annular barrel 43, flanged head 45 secured to said barrel by fastening means 47, and a second flanged head 49 also secured to the barrel at its other end.

Head 45 is provided with internal teeth 51 engaging teeth 35 whereby the ring gear is driven, the internal teeth affording quiet reduction of the gears. The number of teeth in gears 35 and 51 may be as desired. At present we prefer to use 25 teeth for gear 35 and 30 teeth for gear 51. The head 49 extends outwardly as at 55 from the barrel 43 where it is formed as an external pinion 57. It also extends inwardly to form another external gear 59. Slidable upon the splined shaft within the ring gear is a sleeve 61. The sleeve 61 may engage clutch teeth 37 to thereby directly clutch shafts 23 and 29. Secured to sleeve 61 by suitable fastening means is a gear 65 having internal teeth 67. As sleeve 61 is moved from engagement with shaft 23, it may be further moved to effect the engagement of gears 67 and 59. Obviously other numbers of teeth may be made use of, but I have found it desirable to use 38 teeth on gear 59 and 43 teeth on gear 67. The transmission shaft is now driven through an internal gear train involving gear 35 and the teeth 51 of the eccentrically located barrel and then through gear 59 and 67 to the sliding sleeve 61 splined on the transmission shaft 29. It is important to note that the reduction is through two internal external gear trains in each of which the differential is low.

Figure 2:
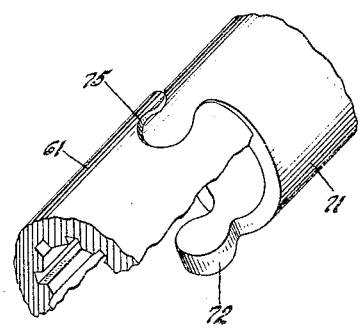
Figure 2 illustrates a detail in perspective.

To effect the sliding of sleeve 61 along the transmission shaft there is used a sleeve 71 formed with a collar 73, the collar 73 being engaged by the fork 17 as shown in the drawing. The end of sleeve 61 has diametrically opposite dove tail openings as at 75 (Figure 2) and similarly shaped projections 72 extend from the ends of the sliding sleeve 71. The engagement of the extensions in the openings is easily made while the sleeves are being assembled on the shafts.

The gear 57 is in mesh with gear 77 on the countershaft 79, the latter being journalled at one end in the partition 37 as at 81, and at its other end in the rear housing wall as at 83. The countershaft is provided with two gears 85 and 87 for what may be termed second speed and for low.

Slidable on the transmission shaft is a sleeve carrying two gears, gear 89 for engaging gear 85 and gear 91 for engaging gear 87. The sleeve carrying gears 89 and 91 has a collar 92 within which are the ends of fork 15 which is movable for shifting the same. The reverse idler shaft carries a pair of united gears 93 and 95, gears 93 and 95 are together slidable by movement of fork 19. When so moved gear 93 is driven by gear 85 of the countershaft and gear 95 is simultaneously moved into mesh with gear 91 to drive the transmission shaft.

The gearing described constitutes a four speed transmission complete in itself, and as such is a distinct improvement over the auxiliary devices which supplement a conventional transmission. The highest speed is through a direct clutch engagement between shaft 23 entering the transmission housing from the clutch housing and shaft 29 extending from the transmission housing to drive the propeller shaft. The first step-down drive is through a noiseless gear train. The noiselessness is assured by the use of the eccentrically located gear through which the drive is effected, there being used two internal-external gear trains wherein the differential between each external and internal gear is low.

The construction is designed for proper bearing application. It avoids overhanging parts, and the attendant distortion and springing of all part which tend to produce mis-alignment and noise. The gear is made practical by avoiding large cylindrical hardened parts with their attendant warping and impracticability of manufacture. They are made in simple cylindrical form with short hubs and small projecting flanges to properly guard against distortion either in manufacture or under the load of operation.

The gears of the internal gear train are kept in rotation to facilitate ease of shifting, thus avoiding the necessity of picking up idle gears when shifting at high car speeds.

By the partial reduction secured by driving the countershaft through one of the internal gear trains there is avoided the necessity of any considerable distance between the centers of the aligned shafts and the counter shaft. It also avoids the necessity of greater gear reduction which might be necessary to compensate for the changed rear axle ratio that will be used with a transmission of this kind. That is, the spur gear which drives the countershaft is itself driven through an internal-external gear reduction from the clutch shaft.

The design is rendered more compact and economical since the internal gears are subject to the direct motor torque only and not to the added torque of lower gear ratios.

Very simple means has been provided for shifting from direct to third speed involving the interlocking sleeve, an arrangement which is simple, cheap and easy of assembly.

The objection of increasing back-lash has been overcome. In the direct drive there is only the clutch between the driving and driven shafts. In third speed no additional parts to give back-lash are introduced. The drive is from the conventional drive shaft gear to an internal gear on the cage (the ring gear) and back through the second internal gear directly to the sliding gear on the splined shaft. There are no more places for back-lash here than in the intermediate drive of the conventional gear shaft.

Lubrication of the entire transmission is assured, an oil bath being provided as usual. Openings 70 may be provided if desired in the cage to lubricate the internal gears by oil thrown off from the countershaft drive gear 57 through the bearings at the rear end of the cage directly into the cage adjacent the gears.

To secure alignment of bearings, the case is so designed as to permit boring of both the main line countershaft and the internal gear cage, boring holes directly in the one casting, thus avoiding inaccuracies of dowels, snap-fits, or other features of an assembled case wherein major boring alignment depends upon the machining of the two pieces.

We claim:

1. In a gearing device, a sliding gear having a hub portion, a sleeve of equal diameter with said hub portion and co-axially arranged, means to slide said sleeve, a plurality of inter-engaging diametrically arranged parts on said sleeve and gear hub whereby the gear is axially moved by the sliding movement of the sleeve and whereby assembly is facilitated.

2. In a gearing device, a cage having a gear, a second gear slidable into engagement with the cage gear and having a hub within the cage, a sleeve of equal diameter with said hub and coaxial with the said second gear, said sleeve and second gear hub having parts integral therewith and interengaged by relative diametrical movement of said parts and means for sliding said sleeve and second gear.

3. In a gearing device, aligned driving and driven shafts, an eccentrically located gear cage surrounding said shafts, gearing between said driving shaft and said cage, said cage having a gear within its walls, a clutch gear within the cage slidably splined on the driven shaft and movable into clutch engagement with said driving shaft or into gear engagement with said inner cage gear, a sleeve slidable on said driven shaft, inter-engaging parts on said clutch gear and sleeve, means outside said cage for sliding said sleeve.

4. A four speed transmission for vehicles, comprising a clutch drive shaft, an aligned transmission shaft piloted relatively thereto, means to directly clutch said shafts including a member slidable on the driven shaft, means to drive the driven shaft from the driving shaft through a pair of internal-external gear trains, the said sliding member constituting the driven gear of the second gear set of said pair, the driving and driven order of the external and internal gears of each gear train being the same, said pair of internal-external gear trains including an eccentrically mounted gear cage, a countershaft, one of the gears of each gear set being carried by the cage, gearing operatively connecting the cage and said countershaft, and gearing between said countershaft and driven shaft.

In testimony whereof we affix our signatures.

PERRY L. TENNEY.
HARRY E. FIDLER.